Feb. 17, 1970 D. ENGELSMANN ET AL 3,495,513
PHOTOGRAPHIC CAMERA WITH BUILT-IN EXPOSURE METER
Filed July 22, 1965
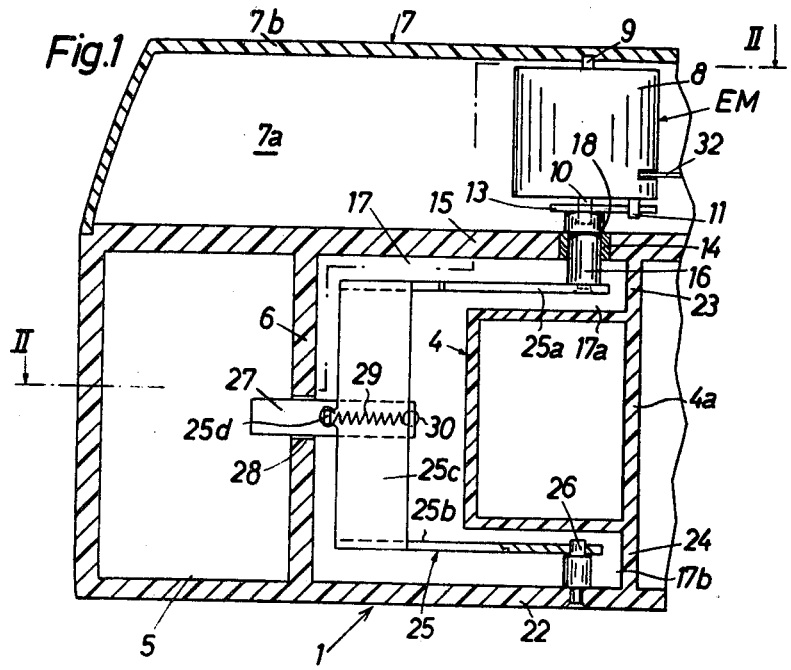
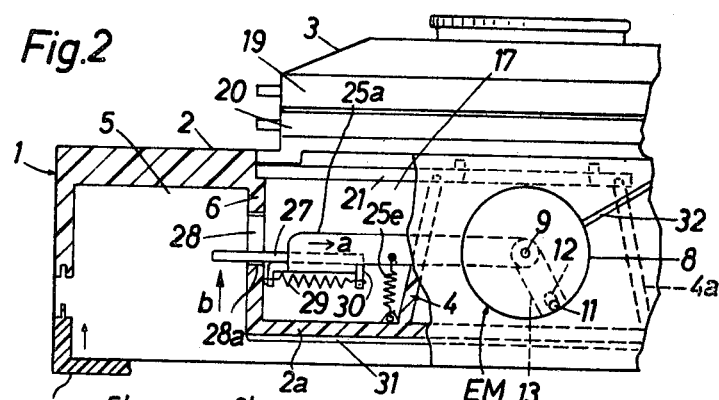
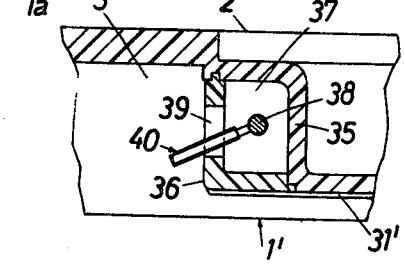
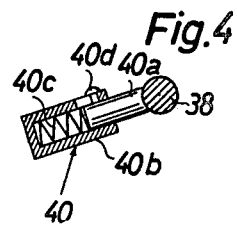
INVENTOR.
DIETER ENGELSMANN
BY KURT ZATTLER
Michael J. Striker
R. H...

ns
3,495,513
PHOTOGRAPHIC CAMERA WITH BUILT-IN EXPOSURE METER
Dieter Engelsmann, Unterhaching, near Munich, and Kurt Zattler, Munich, Germany, assignors to Agfa-Gevaert Aktiengesellschaft, Leverkusen, Germany
Filed July 22, 1965, Ser. No. 474,086
Claims priority, application Germany, July 28, 1964, A 22,166
Int. Cl. G03b 17/06, 19/06
U.S. Cl. 95—10
3 Claims

ABSTRACT OF THE DISCLOSURE

A photographic camera wherein the initial setting of the built-in exposure meter is adjusted by a marker provided on the film cartridge when the latter is properly inserted into a film chamber of the camera housing. A sensing element which can be displaced by the marker extends through an aperture in a partition between the film chamber and a second chamber which is completely sealed against entry of light, and the thus displaced sensing element adjusts the exposure meter by way of a motion transmitting connection which is accommodated in the second chamber and includes a spindle rotatably mounted in one of the walls which surround the second chamber.

---

The present invention relates to photographic cameras in general, and more particularly to a photographic camera having a built-in exposure meter which may but need not be coupled to the diaphragm and/or shutter mechanism. Still more particularly, the invention relates to improvements in a photographic camera of the type wherein a movable part of the built-in exposure meter is automatically adjusted in response to insertion of a film cartridge so as to select the initial setting of the exposure meter by full consideration of the sensitivity of film in such cartridge.

It is already known to provide a film supply cartridge or a take-up cartridge with an adjusting portion or marker which will automatically select the initial position of a movable part of the exposure meter when the cartridge is properly inserted into a chamber defined by the camera housing. The motion transmitting connection between the adjusting portion of the cartridge and the movable part of the exposure meter normally comprises a link train or gear train whose components extend between the chamber for the cartridge and the compartment which accommodates the exposure meter. In many types of cameras, the exposure meter is mounted in a compartment which is defined by a cover or dome attached to the top wall of the camera housing, and this compartment also accommodates certain other assemblies, such as the film transporting mechanism, the range finder, the view finder and/or others. Therefore, it can happen that the compartment is not properly sealed against entry of light and the light which penetrates into the compartment might travel in the space for the motion transmitting components to reach the unexposed film.

Accordingly, it is an important object of our present invention to construct a photographic camera in such a way that light rays which might enter certain zones in the interior of the camera are invariably prevented from reaching the chamber or chambers for the film cartridges despite the fact that the camera comprises an assembly which automatically selects the initial position of the exposure meter in response to insertion of a film cartridge so as to take into consideration the sensitivity of film which is being used to make the exposures.

Another object of the invention is to provide a novel housing for photographic cameras and to construct and assemble the housing in such a way that the penetration of light rays into the film chamber or chambers along the path provided for the motion transmitting connection between the adjusting portion of a film cartridge and a movable part of the exposure meter is prevented in a very simple manner and with absolute reliability.

A further object of the invention is to provide a novel motion transmiting connection between the adjusting portion of a film cartridge and a movable part of the exposure meter in a photographic camera.

Still another object of the instant invention is to provide a novel sensing or scanning element which actuates the motion transmitting connection and which comes into actual engagement with the adjusting portion of a film cartridge when the latter is properly inserted into the respective chamber.

A concomitant object of the invention is to provide a sensing or scanning element which can automatically compensate for any minor inaccuracies in the positioning and/or configuration of a film cartridge.

A further object of the present invention is to provide a still camera which embodies the above outlined features and wherein proper sealing of the film chamber or chambers against penetration of light rays involves a minimum of additional cost and contributes very little to the bulk and/or weight of the camera.

Another object of the invention is to provide a still camera wherein the adjusting portion of a film cartridge may select the initial setting of a galvanometer, of a variable resistor, of an opaque mask for a photosensitive element, or the position of two or more such movable parts in order to fully and accurately account for the sensitivity of that film which is being inserted into the housing.

An additional object of the invention is to provide a camera of the above outlined characteristics wherein the adjustment to account for sensitivity of inserted film is carried out in a fully automatic way so that the user need not worry about such adjustment and that the exposure meter invariably assumes an optimum initial position for accurate indication of light intensity when the cartridges are properly inserted into their respective chambers.

Still another object of the invention is to provide a camera wherein such light rays which might penetrate into the lens mount cannot reach the chambers for the film cartridges.

Briefly stated, one feature of our invention resides in the provision of a photographic camera for use with film cartridges of the type having adjusting portions whose position with reference to the remainder of the cartridge is indicative of the sensitivity of film therein. The camera comprises a housing defining a film chamber and a second chamber adjacent to the film chamber. The housing comprises wall means fully surrounding the second chamber and including a transverse wall which extends between the two chambers. A closure is movable with reference to the housing between a sealing position and an open position to respectively seal the film chamber against entry of light and to afford access to the film chamber for insertion or removal of a film cartridge. The camera further comprises an exposure meter having a movable part operative to adjust the initial setting of the exposure meter so as to account for the sensitivity of film that is being used in the camera, a movable sensing element which extends through an aperture provided in the transverse wall and into the path of the adjusting portion on a cartridge which is being inserted into the film chamber, and a link train or another suitable motion transmitting connection between the sensing element and the movable part of the exposure meter to select the initial setting of the exposure meter in response to displacement of the sensing element by the film cartridge. The motion transmitting connection includes a spindle or an analogous turnable member which is rotatably mounted in the wall means of the housing and prevents entry of light into the second chamber. The exposure meter is mounted outside of the two chambers, preferably in a compartment defined by the top wall of the housing and by a cover which is secured to the housing.

The only way to admit light into the second chamber is through the aperture in the transverse wall; however, the closure prevents entry of light into the film chamber when it assumes its sealing position. Any such light rays which might penetrate into the compartment below the cover are prevented from reaching the film chamber because the turnable member of the motion transmitting connection prevents them from entering the second chamber.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawings, in which:

FIG. 1 is a fragmentary longitudinal vertical section through a still camera which is constructed and assembled in accordance with a first embodiment of our invention;

FIG. 2 is a horizontal section substantially as seen in the direction of arrows from the line II—II of FIG. 1;

FIG. 3 is a fragmentary horizontal section through a slightly modified still camera; and FIG. 4 is an enlarged section through the sensing element of the camera shown in FIG. 3.

The still camera which is shown in FIGS. 1 and 2 comprises a housing 1 made of plastic and including a top wall 15 which supports a metallic cover or dome 7. The front wall 2 of the housing 1 carries an assembly 3, hereinafter called lens mount, which accommodates a customary shutter mechanism, a customary diaphragm mechanism and a system of lenses. A light tunnel 4 extends rearwardly from the front wall 2 and serves to direct light which is allowed to pass through the diaphragm opening against that frame of a roll film (not shown) which is pressed flat against the rear side of a longitudinally extending rear vertical partition or wall 2a forming part of the housing 1. The rear side of the partition 2a is provided with horizontal guides or ways 31 which guide the longitudinal edges of the film. This rear partition 2a cooperates with one or more pressing plates provided on a closure 1a (a portion of which is indicated in FIG. 2) which is movable with reference to the housing 1 between a sealing position and an open position to respectively prevent or afford access to two film chambers 5 each adjacent to one longitudinal end of the rear partition 2a. FIGS. 1 and 2 show only one of the film chambers 5, namely, that chamber which is to receive a film supply cartridge of the type whose mantle is provided with a projection or otherwise configurated adjusting portion capable of automatically selecting the initial setting of a built-in exposure meter EM when the supply cartridge is properly inserted into its chamber 5. The construction of the film supply cartridge is such that the position of the aforementioned adjusting portion with reference to the remainder of its mantle is indicative of the sensitivity of film which is being stored therein. Film cartridges of the type which may be used in the camera of the present invention are disclosed, for example, in the copending applications Ser. Nos. 430,927 and 440,171 of Dieter Engelsmann et al. to which reference may be had if necessary. When the film supply cartridge is properly inserted into the chamber 5 shown in FIGS. 1 and 2, the leading end of the film extends along the guides 31 and across the rear end of the light tunnel 4 and is connected to the take-up cartridge which is accommodated in the other film chamber. Whenever the user actuates the film transporting mechanism, the film is advanced by the length of a frame and the camera is ready to make the next exposure. The aforementioned pressing plate on the closure 1a presses the film against the rear partition 2a to hold it absolutely flat and to insure that the film is properly engaged by the transporting mechanism. The closure 1a may be hingedly attached to or is fully detachable from the housing 1. When moved to open position, the closure 1a will allow for insertion or removal of cartridges from the respective chambers 5 and will also enable the operator to properly attach the film to the transporting mechanism unless, of course, the take-up cartridge is of the type which will be automatically coupled with the film in response to actuation of the transporting mechanism. When moved to sealing position, the closure 1a prevents entry of light into the chamber 5.

The chamber 5 for the film supply cartridge is separated from an adjoining second or intermediate chamber 17 by a transversely extending vertical wall 6 which is provided with an aperture or slot 28. The provision of the fully enclosed second chamber 17 constitutes an important feature of our invention and, once the closure 1a is moved to its sealing position, the chambers 5 and 17 are sealed against entry of light but communicate with each other through the aperture 28.

The cover 7 defines with the top wall 15 an elongated compartment 7a which accommodates several units or assemblies of the camera including certain elements of the built-in exposure meter EM. For example, the compartment 7a may further accommodate a view finder, a range finder and certain elements of the film transporting mechanism including a lever or wheel which is actuated by the user in order to advance the film from the supply cartridge to the take-up cartridge or vice versa. Since the lever or wheel of the transporting mechanism must extend from the cover 7 and since the view finder and range finder necessitate the provision of windows for admission or passage of light, the compartment 7a might not be fully sealed against entry of light, and an important object of our invention is to prevent light which might have penetrated into the compartment 7a from reaching the film chamber 5 and the unexposed film therein.

The exposure meter EM comprises an electrical instrument here shown as a galvanometer 8 whose casing is provided with coaxial shafts 9, 10 the former of which is journalled in the top panel 7b of the cover 7. The lower shaft 10 is journalled in a turnable motion transmitting member here shown as a shaft or spindle 16 which is rotatable in a bearing sleeve 14 inserted into a bore formed in the top wall 15 of the housing 1 and providing a passage between the compartment 7a and a horizontal upper extension 17a of the second chamber 17. The galvanometer 8 is connected in circuit with a light sensitive element (not shown) such as a photoelectric resistor or a photoelectric cell in a manner well known from the art of exposure meters, and its pointer 32 will be deflected to an extent which is a function of the intensity of light reaching the resistor or cell so that, upon determining the position of the pointer 32, the user may properly select the exposure values including the exposure time and the size of the diaphragm opening. If the camera is of the automatic type, the angular position of the pointer 32 may be scanned by a suitable device which will automatically select the size of the diaphragm opening and/or the exposure time in dependency on the intensity of light coming from a subject or scene. Such camera are well known in the art, and the exact manner in which the pointer 32 of the galvanometer 8 may be coupled with the diaphragm mechanism and/or shutter mechanism forms no part of our present invention.

The casing of the galvanometer 8 carries an eccentric pin or stud 11 which extends into the bifurcated end portion 12 of a motion transmitting link 13 which is rigid with the spindle 16, and more particularly with an annular collar 18 at the upper end of the spindle. The collar 18 is accommodated in the compartment 7a and prevents axial movements of the spindle 16. The lower shaft 10 of the galvanometer 8 is received in an axially extending blind bore provided in the top face of the collar 18 so that the spindle 16 constitutes the lower journal for the galvanometer. The clearance between the peripheral surface of the spindle 16 and the internal surface of the bearing sleeve 14 is so minimal that light which might enter the compartment 7a cannot penetrate into the second chamber 17. The sealing action of the spindle 16 is enhanced by its collar 18 whose lower end face abuts against the top end face of the bearing sleeve 14. As stated hereinbefore, the compartment 7a might not be fully sealed against entry of light because it accommodates certain elements of the film transporting mechanism including a lever or wheel which must be accessible to the user, and also because the cover 7 must be provided with windows or other forms of cutouts to mount the components of the view finder, range finder and other assemblies forming part of a modern still camera.

The lens mount 3 carries adjusting rings 19 and 20 which are manipulated by the user to select the size of the diaphragm opening, to select the exposure time, to convert the camera from manual to automatic or semiautomatic selection of exposure values, to change the focal length of the objective and/or to carry out certain other adjustments. Therefore, the lens mount 3, too, might not be fully sealed against penetration of light rays. To prevent uncontrolled entry of light, the front side of the second chamber 17 is sealed by a longitudinally extending vertical front partition or wall 21 which is recessed into the front wall 2 and is provided with a cutout registering with the inlet to the light tunnel 4. As shown in FIG. 2, the front partition 21 extends from the transverse vertical wall 6 and all the way to the remote transverse wall 4a of the light tunnel 4. This wall 4a has upwardly and downwardly extending portions 23, 24 the former of which is integral with or is sealingly secured to the top wall 15 and the latter of which is integral with or is sealingly secured to the bottom wall 22 of the housing 1. In other words, when the closure 1a is moved to sealing position, the chambers 5 and 17 shown in FIGS. 1 and 2 are fully sealed against penetration of light. The second chamber 17 is surrounded by the wall 6, by the light tunnel 4, by the top and bottom walls 15, 22, by the front and rear partitions 21, 2a and by the vertically extending portions 23, 24 of the tunnel wall 4a.

The lower end portion of the spindle 16 extends into the upper extension 17a of the second chamber 17 and is rigidly secured to the upper horizontal arm or flange 25a of a substantially U-shaped motion transmitting lever 25. The lower horizontal flange or arm 25b of the lever 25 is rotatable on a pivot 26 which is accommodated in the lower extension 17b of the second chamber 17 and is mounted in the bottom wall 22 of the housing 1. The axis of the pivot 26 coincides with the axis of the spindle 16. The web 25c of the lever 25 is coupled with a movable spring-biased sensing element 27 which extends through the aperture 28 in the wall 6 and into the film chamber 5 so as to be located in the path of a supply cartridge when the latter is inserted in the direction indicated in FIG. 2 by an arrow *b*.

Another advantageous feature of our invention resides in such mounting of the sensing element 27 that it may change its position with reference to the lever 25 in order to compensate for certain minor inaccuracies in the shape, position and/or dimensioning of the supply cartridge. The connection between the lever 25 and sensing element 27 comprises a helical spring 29 one end of which is connected with a lug 30 at the rear end of the sensing element and the other end of which is connected with a similar lug 25d on the web 25c. The aperture 28 extends forwardly toward the front wall 2 and is long enough to allow for requisite adjustments in the initial position of the galvanometer 8 to take into consideration the sensitivity of film accommodated in that supply cartridge which is inserted into the film chamber 5. The spring 29 tends to move the sensing element 27 in a direction to the left, as viewed in FIG. 1 or 2, i.e., deeper into the film chamber 5, but will yield (see the arrow *a* in FIG. 2) if the shape of the supply cartridge deviates slightly from normal.

When the user decides to insert a fresh film supply cartridge, the closure 1a is moved to open position to afford access to the film chamber 5. The user then inserts the cartridge in the direction indicated by the arrow *b* whereby the adjusting portion of the cartridge engages the sensing element 27 and rocks the lever 25 in a clockwise direction, as viewed in FIG. 2, which results in a clockwise angular displacement of the galvanometer 8 and its pointer 32. The extent of such angular displacement is indicative of the sensitivity of film in the supply cartridge and the initial position of the exposure meter EM is now properly adjusted so that the readings obtained by observing the position of the pointer 32 when the photosensitive resistor or cell of the exposure meter will be exposed to light coming from a viewed scene or subject will reflect the sensitivity of film which is being used in the camera. The leading end of the film is placed into the guides 31 and is connected to or is properly aligned with the take-up cartridge. At the same time, the perforations of the leading end receive the teeth of the sprocket or sprockets forming part of the film transporting mechanism and the user then returns the closure 1a to sealing position. The camera is ready for use and the angular position of the casing forming part of the galvanometer 8 will remain unchanged because the lever 25 is biased to a starting position by a return spring 25e which tends to maintain the sensing element 29 in abutment with a stop surface 28a bounding the rear portion of the aperture 28 in the wall 6.

It will be seen that the improved housing 1 defines two film chambers 5 which are connected by the space through which the film extends along the guides 31 in front of the rear wall 1a, a light tunnel 4 which admits light coming through the diaphragm opening to the film frame located behind the lens mount 3, a compartment 7a which might but often is not sealed against entry of light, and the chamber 17 which is fully sealed against entry of light as soon as the closure 1a is moved to sealing position and which accommodates the motion transmitting parts (such as the link train 13, 25) of the operative connection between the sensing element 27 and the adjustable part 8 of the exposure meter EM. This means that the manufacturer need not be too concerned with the sealing connection between the cover 7 and housing 1 because, even if some light should penetrate into the compartment 7a, such light cannot reach the film in the chamber 5.

It is clear that the sensing element 27 may select the initial position of another adjustable part of the exposure meter. For example, the sensing element 27 could be arranged to shift an opaque mask with reference to a photosensitive resistor or cell so that the exposed area of such resistor or cell would be changed as a function of the sensitivity of film in the chamber 5. Alternatively, the circuit of the exposure meter EM may comprise a variable resistor whose resistance is adjusted by the sensing element 27 as a function of the sensitivity of film in the supply cartridge. Also, and as stated hereinbefore, the exposure meter EM may be of the type which is or can be directly coupled with the diaphragm mechanism and/or shutter mechanism to automatically select one or more exposure values as a function of the intensity of light coming from a scene or subject.

FIG. 3 illustrates a portion of a modified camera wherein the second chamber 37 is defined by an L-shaped wall section 35 of the housing 1' and by a similar detachable second L-shaped wall section 36. One leg of the wall section 36 corresponds to the transverse wall 6 shown in FIGS. 1 and 2 and is formed with an aperture 39 for a movable sensing element 40. The other leg of the wall section 36 corresponds to a portion of the rear partition 2a shown in FIG. 2 and its rear side carries a portion of the guides 31'. The wall sections 35, 36 extend all the way from the bottom wall to the top wall of the housing 1' and the chamber 37 accommodates a vertical spindle or shaft 38 which is rigid with the sensing element 40 and is rotated in a clockwise direction when the sensing element is engaged by a supply cartridge during insertion into the film chamber 5'. The numeral 2' denotes the front wall of the housing 1'. The chamber 37 is of substantially rectantangular cross-sectional outline and is fully sealed against entry of light as soon as the closure 1a (not shown) is moved to sealing position.

As illustrated on a larger scale in FIG. 4, the sensing element 40 may comprise two telescopically connected portions 40a, 40b which are biased apart by a spring 40c corresponding to the spring 29 of FIGS. 1 and 2 and serving to compensate for any inaccuracies in the shape of the supply cartridge. A radial stud 40d prevents complete expansion of the spring 40c and keeps the portion 40b on the portion 40a.

The upper end portion of the spindle 38 is sealingly mounted in the top wall of the housing 1' in the same or analogous way as shown for the spindle 16 of FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera for use with film cartridges of the type having an adjusting portion whose position with reference to the remainder of the cartridge is indicative of the sensitivity of film therein, a housing defining a film chamber and a second chamber adjacent to said film chamber, said housing comprising wall means fully surrounding said second chamber and including a transverse wall between said chambers, a top wall above said second chamber, a light tunnel spaced from said top wall and a bottom wall spaced from said light tunnel, said second chamber having a main portion located between said light tunnel and said film chamber, a first extension located between said light tunnel and said top wall and a second extension located between said light tunnel and said bottom wall; a closure movable with reference to said housing between sealing and open positions to respectively prevent entry of light into and to expose said film chamber for insertion or removal of a film cartridge; a cover provided on said housing and defining therewith a compartment located above said top wall; an exposure meter including a movable part located in said compartment and operative to effect different initial settings of the exposure meter so as to account for various film sensitivities; a movable sensing element extending through an aperture provided in said transverse wall and into the path of the adjusting portion of a cartridge which is being inserted into said film chamber; and a motion transmitting connection between said sensing element and said movable part to select the initial setting of said exposure meter in response to displacement of said sensing element by the adjusting portion of the cartridge in said film chamber, said connection comprising a turnable member mounted in said top wall and a U-shaped lever having an upper arm attached to said turnable member and located in said first extension, a lower arm located in said second extension and pivotable about an axis coinciding with the axis of said turnable member, and a web located in said main portion and coupled with said sensing element.

2. A structure as set forth in claim 1, further comprising a pivot mounted in said bottom wall and turnably supporting the second arm of said lever.

3. In a photographic camera for use with film cartridges of the type having an adjusting portion whose position with reference to the remainder of the cartridge is indicative of the sensitivity of film therein, a housing defining a film chamber and a second chamber adjacent to said film chamber, said housing comprising wall means fully surrounding said second chamber and including a transverse wall between said chambers; a closure movable with reference to said housing between sealing and open positions to respectively prevent entry of light into and to expose said film chamber for insertion or removal of a film cartridge; an exposure meter carried by said housing outside of said chambers and including a movable part operative to effect different initial settings of the exposure meter so as to account for various film sensitivities; a movable spring-biased sensing element extending through an aperture provided in said transverse wall and into the path of the adjusting portion on a cartridge which is being inserted into said film chamber, said sensing element comprising two portions one of which is telescoped into the other portion and resilient means tending to move such portions apart; and a motion transmitting connection between said sensing element and said movable part to select the initial setting of said exposure meter in response to displacement of said sensing element by the adjusting portion of the cartridge in said film chamber, said connection comprising a turnable member mounted in said wall means.

References Cited

UNITED STATES PATENTS 3,025,777  3/1962  Wilkenson.

FOREIGN PATENTS 1,296,960  5/1962  France.
864,803  1/1953  Germany.

JOHN M. HORAN, Primary Examiner

JOSEPH F. PETERS, JR., Assistant Examiner

U.S. Cl. X.R.

95—31